Oct. 17, 1967  F. A. SCHWEIGER  3,347,553
FLUID SEAL

Original Filed May 10, 1963

INVENTOR.
FRANK A. SCHWEIGER
BY Gerald L. Moore

ATTORNEY-

Oct. 17, 1967     F. A. SCHWEIGER     3,347,553
FLUID SEAL
Original Filed May 10, 1963     2 Sheets-Sheet 2
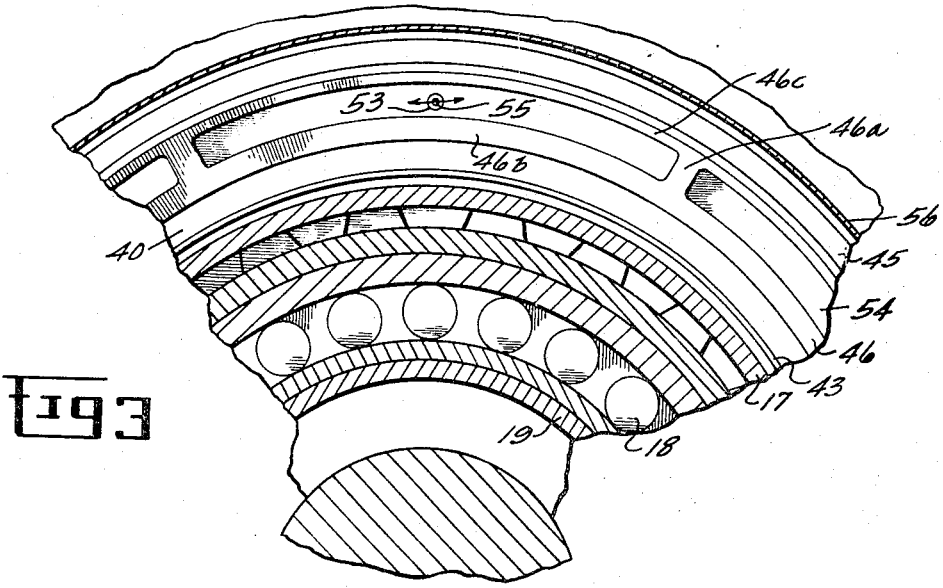
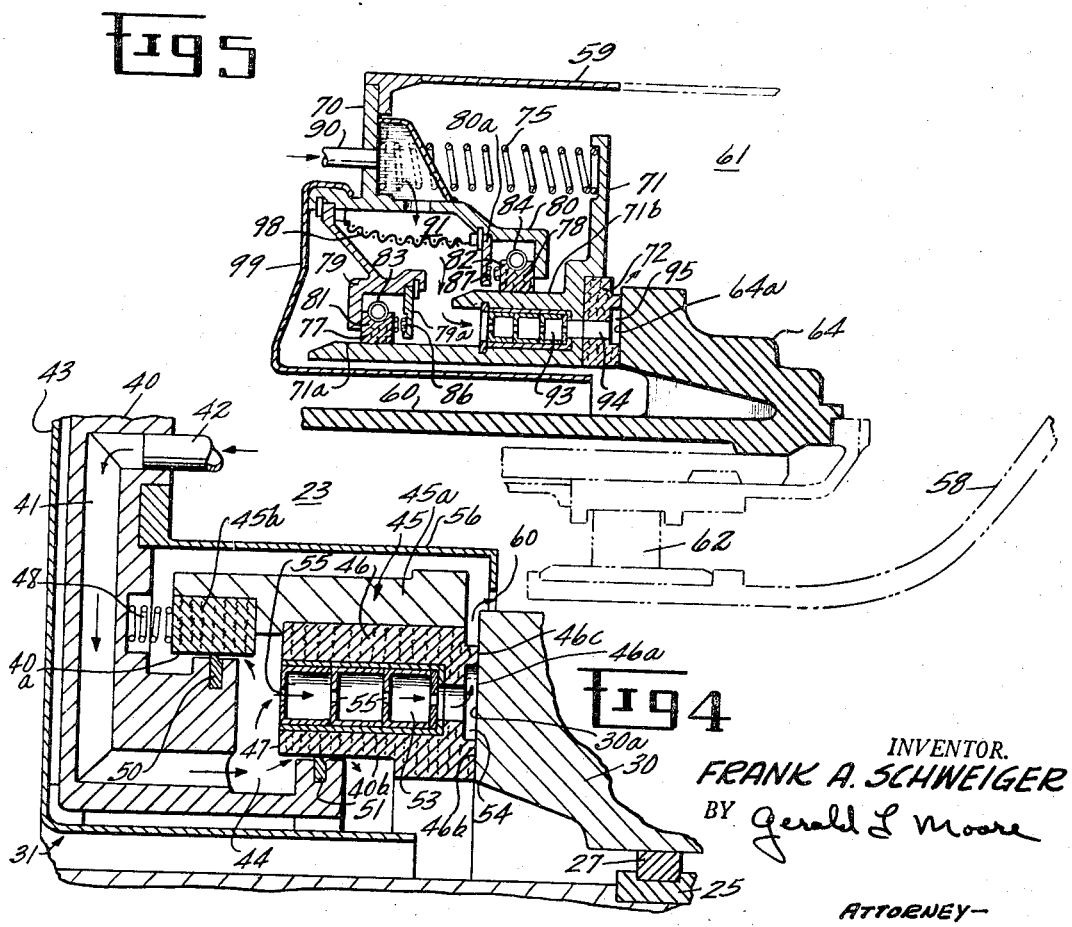
INVENTOR.
FRANK A. SCHWEIGER
BY Gerald L. Moore
ATTORNEY

United States Patent Office 3,347,553
Patented Oct. 17, 1967

3,347,553
FLUID SEAL
Frank A. Schweiger, Cincinnati, Ohio, assignor to General Electric Company, a corporation of New York
Continuation of application Ser. No. 279,473, May 10, 1963. This application May 23, 1966, Ser. No. 552,337
3 Claims. (Cl. 277—27)

This application is a continuation of application Ser. No. 279,473, filed May 10, 1963, and now abandoned.

This invention relates generally to fluid seals for sealing between relatively rotatable members and more particularly to a floating seal structure providing means for internal fluid pressurization of the seal juncture to reduce physical contact between the seal faces and to provide fully effective sealing under varying operating conditions even while allowing for relative axial movement of the members sealed between.

In applications such as aircraft turbojet engines the engine rotor shaft seals and other seals are subjected to extreme heat, to high shaft speeds and to high levels of vibration, and in many cases must accommodate substantial relative movement caused by differential thermal expansion of the members sealed between. At this same time, the effectiveness and reliability of seal action is critical in such applications since failure of the engine seals may result in loss of engine power with consequent danger to the aircraft.

One such seal application is adjacent the engine main bearing lubricant sumps, where it is necessary to seal the engine rotor shaft against leakage of lubricant from the sump. These rotor shaft seals commonly are of either the circumferential or face seal type, and generally comprise a carbon ring carried on stationary support structure and having radial or axial rubbing contact either with the shaft itself or with a seal collar carried on the shaft, for sealing against leakage flow of lubricant from the sump. A pressure chamber is provided outside this lubricant seal to which pressured fluid, generally compressor discharge air in turbojet applications, is ducted to cool the seal and also to pressurize it so as to assure that all leakage through the seal is air flow into the sump rather than lubricant flow outwardly from the sump. This leakage air flow through the seal may also serve to pressurize the sump to thus provide a positive pressure head to the sump pump which circulates lubricant back to the engine lubricant tank.

The seal structure of the present invention is adapted to provide in this and like environments a significantly enhanced performance potential over the conventional seal structure just described, particularly with respect to service life expectancy, certainty of protection against lubricant leakage, and tolerance to extreme high temperatures. These characteristics, and particularly high temperature tolerance and good leakage protection, assume critical significance in turbojet engines for high mach supersonic aircraft, because in such aircraft the operating temperature levels can become so high that lubricant exposed to air through seal leakage may burst into flame or may "coke" into a hard residue seriously effecting seal and engine operation.

Another problem of these high performance engines is that their compressor discharge air is normally at such high temperatures as to require that any compressor bleed air used for seal cooling and pressurization be cooled prior to such use. Therefore, to keep the size and weight of the necessary air cooling equipment to a minimum, it becomes desirable to provide more efficient fluid seals to reduce the amount of pressurizing and cooling air needed. In some applications it may be necessary to pressurize the lubricant seals with an inert atmosphere such as nitrogen, both for better cooling and for prevention of seal coking or engine fires. Naturally any supply of such inert atmosphere is limited, especially with aircraft usage, and for this reason efficient seals are even more necessary in these applications.

It is therefore one object of this invention to provide a fluid pressurized type seal wherein physical contact between the seal faces is minimized by a fluid pressure controlled clearance maintained between them, and effective sealing is provided notwithstanding this clearance.

It is another object of this invention to provide such a seal utilizing an air bearing principle with the secondary seals positioned to allow a force balancing effect on the seal and allow for controlled seal clearances thereby reducing seal wear.

It is another object of this invention to provide such a seal supported from a first member utilizing an axially movable sealing surface on the second member to reduce axial travel of the seal itself and thus increase seal efficiency.

Accordingly, in carrying out these and other objects of this invention, there is provided a seal assembly for effecting a seal between relatively rotatable members comprising first and second seal elements each mounted on one of the relatively rotatable members and together defining a primary seal juncture. At least the first seal element is free for translatory movement on the member to which mounted, and defines therewith a chamber closed by a pair of secondary seals of the contact type operative between the first seal element and member. The primary seal is pressurized at the primary seal juncture intermediate the edges thereof of fluid from a pressure fluid source connected through flow passage means including the chamber between the secondary seals and further including flow restrictor means of metering the pressure fluid supply to the seal juncture, in a manner to maintain controlled clearance between the seal elements. The secondary contact seals preferably are located at different radii to allow the sealant fluid under pressure in the chamber closed thereby to exert a biasing force in the primary seal, and if desired the second seal element may also be free for translatory movement on the member to which it is mounted while the same time being axially fixed with respect to the other relatively rotatable member to allow axial movement between the rotatable members without affecting the operation of the primary seal.

Other objects and many of the attendant advantages of this invention will be readily appreciated as the same becomes better understood by reference to the following detailed description when considered in connection with the accompanying drawings, wherein:

FIG. 3 is a cross-sectional view along the lines 3—3 of FIG. 2;

FIG. 4 is a fragmentary sectional view similar to FIG. 2 but further enlarged; and FIG. 5 is a cross-sectional view of a second embodiment of the invention.

Figure 1:
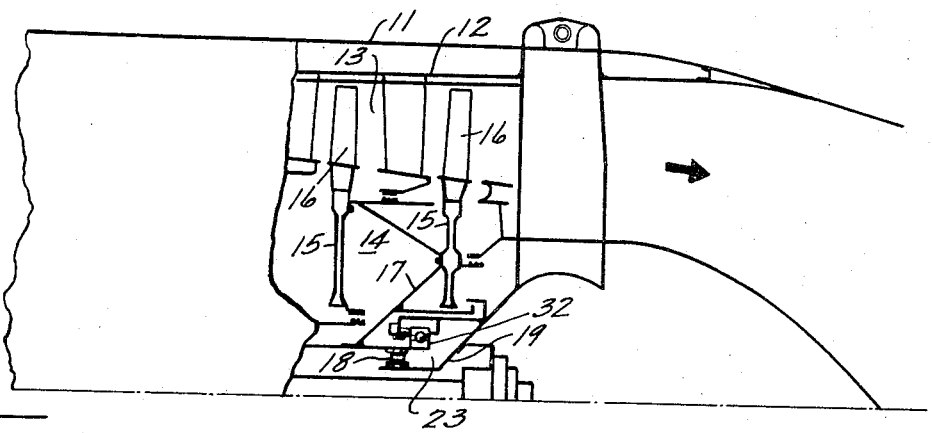
FIG. 1 is a partial cross-sectional view of a turbojet engine incorporating one embodiment of the invention in a representative application thereof.

Referring now to FIG. 1, therein is illustrated in partial cross-section a turbojet engine representing one typical application of the subject invention. The engine as shown comprises an outer annular casing 11 which, together with an inner casing 12, forms the outer wall of a gas flow duct 13 for passage of the primary gas flow of the turbojet. A two-stage turbine rotor assembly 14 including turbine wheels 15 is disposed concentrically within the duct 13 with the attached turbine blades 16 extending outwardly into the primary gas flow passage. A shaft 17 rotatably supports the turbine rotor assembly and is in turn supported from the stationary frame member 19 by roller bearings 18.

Figure 2:
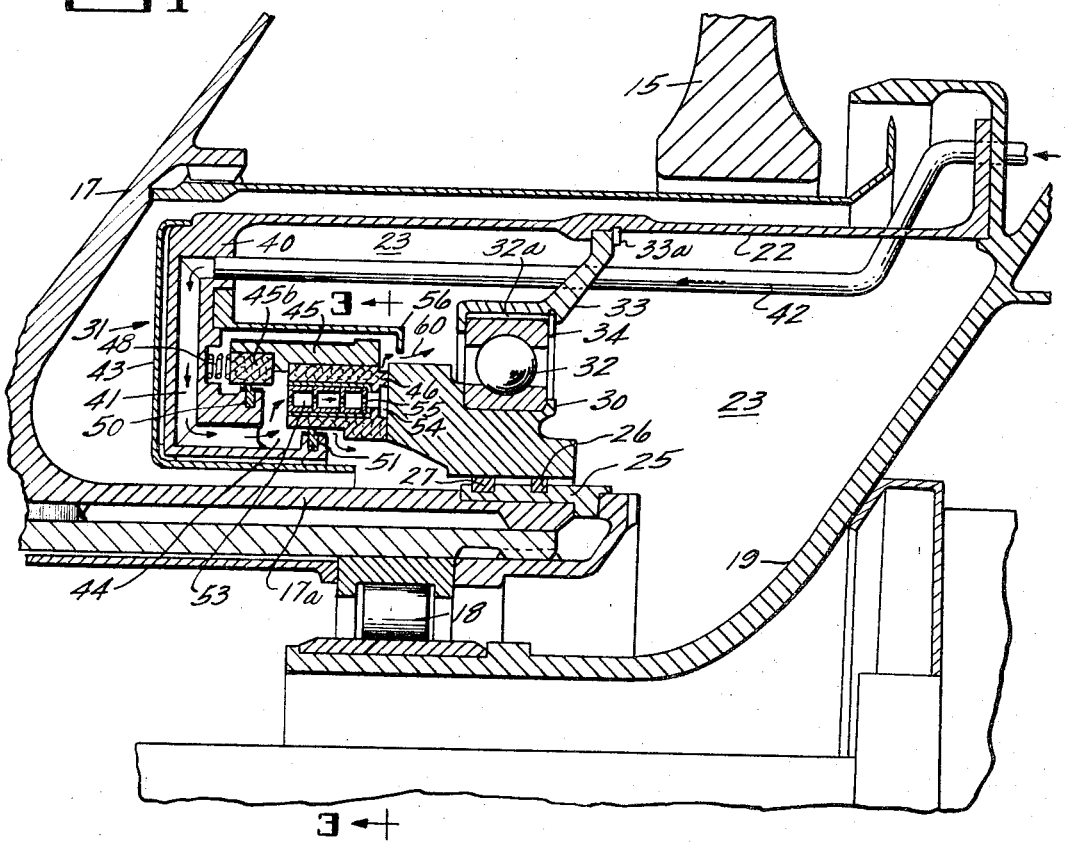
FIG. 2 is an enlarged cross-sectional view of seal structure in accordance with the invention, shown in the engine environment of FIG. 1.

Referring now also to FIGS. 2, 3 and 4 which show the seal and bearing assembly in enlarged detail, the turbine frame member 19, an attached wall member 22 and the seal assembly designated generally by reference numeral 31 together form a sump 23 for lubricant for the turbine shaft bearing 18. An annular member 25 affixed to the axially extending portion 17a of turbine shaft 17 supports a seal collar member 30 rotatably driven with the member 25 and shaft 17 by a split ring 27 providing driving interengagement between the member 25 and the collar 30. This collar 30 includes an axially facing sealing surface 30a (FIG. 4) which constitutes one of the primary seal surfaces of the seal assembly 31.

The rotating collar 30 is free for axial movement with respect to the shaft member 25 but is axially fixed with respect to the stationary frame member 19 by connection through a bearing 32. This bearing is permitted limited radial movement by provision of radial clearance between its outer race 32a and the bearing support member 33. Bearing 32 is held within support member 33 by a split ring 34 and the support member 33 is similarly attached to the sump wall member 22. In this manner the seal collar 30 is fixed axially with respect to the stationary frame structure and at the same time is free to be driven by split ring 27 in rotation with the turbine rotor shaft 17. A sliding seal 26 is provided to seal against leakage of lubricant from the bearing sump 23 outwardly between the turbine shaft and seal collar.

The stationary or non-rotating portion of the seal assembly 31 is carried by a main seal support member 40 shown as an extension of the sump wall 22. A pressure fluid passage 41 formed within support member 40 connects at one end with a conduit 42 extending outwardly through the sump wall 22 to an external fluid pressure source, not shown, and at its other end the passage 41 opens into a chamber 44 to supply pressure fluid for operation of the seal and for pressurization of the sump as will be explained hereinafter. A heat shield 43 may be provided as shown to insulate the seal from heat radiated from adjacent parts of the turbojet.

Supported on the stationary support 40 by a rubbing fit with surfaces 40a and 40b is a floating seal element generally indicated at 45 including a seal carrier member in the form of an annular ring member 45a counterbored to receive an annular seal nose piece 46. As best shown in FIG. 4, the nose piece 46 provides a seal face comprising two radially spaced sealing surfaces 46b and 46c with these surfaces joined at circumferentially spaced intervals by surfaces 46a to form a plurality of circumferentially extending recesses 54 in the seal face. Surfaces 46a, 46b and 46c, together with the rotating collar surface 30a, form the primary seal juncture.

The seal carrier member 45a is also counterbored to receive an annular ring member 45b against which bear a plurality of circumferentially disposed compression springs 48, only one of which is illustrated in FIG. 4. Springs 48 are compressed between ring member 45b and seal support member 40 to bias the seal element toward the collar 30. Between adjacent surfaces of the seal element 45 and support member 40 a pair of secondary contact seals 50 and 51 provide sealing for the closed annular chamber 44 formed by and between these components. As shown the secondary seals are of a split ring type with the rings recessed in annular grooves cut in the support member 40 and expanding outwardly into engagement with surfaces 40a and 40b formed on members 45b and 46, respectively. Members 45b and 46 preferably are made of carbon or a similar non-metallic material for better sealing against the split rings 50 and 51, and it is for this reason that these members are, as shown, not made integrally with the seal carrier member 45a, which preferably is metallic for structural purposes.

The seal nose piece 46 includes a plurality of circumferentially spaced fluid passages 53 each of which opens at one end into the sealant chamber 44. At its other end each passage connects to one of the circumferentially elongated recesses 54 formed in nose piece 46 at the primary seal juncture between the nose piece and the sealing surface 30a. Flow restrictor means such as the orifices 55 shown are provided within the fluid passage 53 to control the flow of fluid through the passage. By use of these orifices 55 the pressure drop of the fluid passing through the passages 53 may be controlled thereby controlling the fluid pressure within the recesses 54. These orifices assemblies may be replaced if other pressure reductions through these passages are desired to allow control of the pressure within the recesses 54, also by use of several orifices in series arrangement the same pressure drop may be effected by use of larger orifices presenting less susceptibility to clogging. A shield 56 may be provided within the sump to prevent direct splashing of lubricant on the seal assembly at the primary sealing juncture to further enhance the effectiveness of the seal.

In operation of this embodiment of the invention, lubricant is supplied through conduit means (not shown) to the bearing 18 and collects within the sump 23. The turbine shaft 17 rotates and drives the seal collar member 30 through ring 27, and bearing 32 axially positions the collar 30 to limit movement of the collar with respect to the seal support member 40 due to thermal growth of the turbine shaft or other causes. The seal element 45 and its attached nose piece 46 are biased by springs 48 against the collar so that the sealing surfaces 30a and 46a contact to form the primary seal juncture. Secondary contact seals 50 and 51 seal between the seal element 45 and seal support member 40.

As is also true in conventional seal assemblies, rubbing contact between sealing surfaces such as at 30a and 46a can result in wear of the sealing surfaces. To avoid or minimize this contact, and also to prevent leakage of lubricant from sump 23 outwardly past the secondary seals 50 and 51, pressurizing fluid is supplied through conduit 42 and passage 41 into the chamber 44. From this chamber some small part of the pressurizing fluid may escape through the secondary seals 50 and 51, and since this pressurizing fluid flow past the secondary contact seals is counter to any leakage flow of lubricating fluid past the seals it serves effectively to block such leakage. The flow through the orifices 55 into the cavities 54 forms a high pressure area within each cavity 54 in the manner of an air bearing creating a first force on the seal nose piece 46 to move it away from the collar 30 by overcoming the bias of springs 48 to allow fluid flow out from between the nose piece and the collar. This flow is indicated by the arrow 60 with most of the flow being in the direction toward the sump 23 or radially outward since that surface 46c of the nose piece is dimensionally smaller in a radial direction than surface 46b thereby presenting less resistance to fluid flow. This flow is counter to any leakage flow of lubricating fluid from the sump 23 through the primary seal juncture thereby limiting any such flow and further serving to pressurize the sump 23 as mentioned heretofore as well as cooling the seal and sump assemblies. Further, by the creation of this high pressure area within the cavity 54 and forcing the nose piece 46 away from the collar 30 a constant flow of high pressure fluid therein results in spacing these two sealing members apart during operation so that there is only limited physical contact therebetween which naturally results in less seal wear. A minimum of three such pressured cavities 54 around the seal juncture is generally provided to maintain uniform clearance and provide a self-centering seal juncture.

A second force on the nose piece 46 results from the pressured fluid within the cavity 44 acting on the side 47 of the nose piece to partially counteract the separating force exerted at the primary seal juncture described heretofore. This force is effected by locating the secondary contact seals 50 and 51 at different radii thereby exposing the surface 47 to the pressurized gas within cavity 44. In this manner a self regulating seal is provided in that if the primary seal juncture separation is larger than the normal designed separation the pressure of the fluid within the cavity 54 will decrease due to increased fluid flow from the cavity between the sealing surfaces 30a and 46a. The separating force on the nose piece surface 46a thereby decreases allowing the fluid created force on surface 47 to close the separation by forcing the nose piece 46 toward the collar 30. Similarly if the separation at the primary seal juncture becomes less than that designed, the pressure within 54 will increase due to less flow therefrom while that within cavity 44 remains substantially equal thereby moving the nose piece 46 to open the primary seal juncture. The rate of flow of fluid from the cavity 44 to the cavity 54 and therefore the rate of compensating for changes in magnitude of the primary seal clearance is controlled by the size of the orifices 55. Further the balanced fluid forces on the floating seal assembly 45 is relatively unaffected by changes in pressure of the gas supplied from cavity 44 since the same gas pressurizes both cavities 44 and 54.

An added benefit derived by specific location of the secondary contact seal 51 may be gained by locating the sealing surface 40b on the same radius as the center of pressure exerted by fluid acting on the smaller radius surface 46b. In this manner the positioning of the floating seal assembly is made unaffected by any fluid pressure forces created by the fluid surrounding the sump outer wall 22 and shield 43 acting on the exposed surfaces of the floating seal assembly since such forces equalize each other during operation of the seal.

From the foregoing it is obvious that the seal structure described is self-aligning by reason of the controlled separation between the nose piece 46 and the collar 30, and that lubricant leakage flow through either the primary or the secondary seals is effectively prevented by a counterflow of pressure fluid. This seal structure also allows for differential axial movement between the rotatable members with any long term axial movement such as that due to thermal growth of the members compensated for by movement between the collar 30 and the turbine shaft 17 and all necessary freedom of axial movement within the seal structure itself is provided by the floating mounting of seal element 45. Also, since the loading spring and fluid pressure derived forces on the floating seal element 45 are balanced, the clearance between the primary sealing surfaces is closely controlled to limit contact and leakage flow therebetween so as to limit the flow of pressurizing fluid to the minimum necessary to assure against outward flow of lubricating fluid.

This seal structure offers further advantages in ease of assembly. With the open ended configuration of the seal support member 40 the seal element 45 may easily be inserted axially and positioned with the secondary seal elements engaging. Thereafter the collar member 30 may be assembled into position in locking engagement with the split ring 27 with the bearing support member 33 locked into position by split ring 33a. It can be seen that in addition to the advantages of efficient operation this seal presents the advantage of ease of assembly.

Turning now to FIG. 5 and the second embodiment of the invention shown therein, a stationary turbine frame member 58 and an attached sump wall member 59 together define, in surrounding relation to the turbine rotor shaft 60, a sump 61 for lubricant for the turbine shaft bearing 62. This bearing 62 serves as the support between the rotating and stationary members as in the embodiment of FIG. 1. Unlike the previous embodiment, however, FIG. 5 shows the seal collar member 64 as part of or fixed to the rotor shaft 60 without provision for axial movement thereon. Such simplification of structure is permissible in applications wherein relative axial movement between the turbine shaft and frame is such that it can be accommodated by the freedom of axial movement permitted the floating seal element as hereinafter explained.

A primary seal support member 70 fixed to the sump wall 59 supports a floating seal element 71 on which is carried a seal nose piece 72, preferably made of carbon, forming a primary seal juncture with the sealing surface 64a on the collar 64. A plurality of circumferentially spaced loading springs 75 are compressed between the support member 70 and the seal element 71 to bias the seal element and the attached seal nose piece 72 against the collar 64. In this embodiment two secondary contact seals 77 and 78 are supported from seal housings 79 and 80, respectively, to allow for differential axial movement between the floating seal element 71 and the primary support member 70 while restricting fluid leakage therebetween. These seal assemblies comprise segmented ring seals 81 and 82 held within the seal housings 79 and 80 by rings 79a and 80a with garter type spring assemblies 83 and 84 biasing the seals against sealing surfaces 71a and 71b on the member 71. Springs 86 and 87 compressed between the seal segments and ring members 79a and 80a bias the seal segments against their respective seal support members in sealing relation therewith.

A pressure fluid supply conduit 90 is provided leading into a closed chamber 91 formed between the seal element 71 and the support member 70 to which it is mounted, with conduit 90 connected to a source (not shown) of pressurizing fluid such as air or inert gas. Leakage gas flow from chamber 91 is restricted by the secondary seals 77 and 78, and as explained in connection with the first embodiment any leakage of pressurzing fluid through these secondary seals serves to prevent lubricant leakage from the sump 61 in the opposite direction. The pressure fluid may flow through a plurality of passages 93 provided within the seal element 71 and passages 94 within the seal nose piece 72 into one of a like plurality of circumferentially extending recesses 95 formed in the nose piece 72 opposite the collar sealing surface 64a. These function in the same manner as in the previous embodiment, both to prevent the flow of lubricant from sump 61 and to maintain the primary seal surface in spaced relationship to limit physical contact and resultant wear. The axial position of seal element 71 is determined by the balance of spring and fluid pressure derived forces acting upon the seal element in the same manner as in the embodiment of FIG. 2.

A screen 98 may be mounted within the chamber 91 as shown to prevent the passage of foreign matter into the chamber to thus prevent contamination of the primary and secondary seal assemblies. Also, a radiation heat shield 99 may be provided to insulate the seal from heat radiated from adjacent parts of the engine. It can be seen that this embodiment of the invention incorporates the same principles of operation as the first embodiment but allows the use of externally located secondary contact seals which may be desirable in some seal applications.

While particular embodiments of the invention have been illustrated and described, it will be obvious to those skilled in the art that various changes and modifications may be made without departing from the invention and it is intended to cover in the appended claims all such changes and modifications as come within the true spirit and scope of the invention.

I claim:

1. Means for providing a seal between two relatively rotating members,
   said sealing means comprising,
   a ring mounted on one of said members for axial movement towards and away from the other of said members,
   said ring and the other of said members having opposed radial sealing surfaces, an annular means defining a chamber on the side of said ring opposite its sealing surface, inner and outer means for circumferentially sealing said chamber between said ring and said one member so that the chamber may be pressurized and the ring may be axially displaced, said ring member having interrupted circumferential grooves defining inner and outer annular lands on its sealing surface, passageway means extending through said ring and connecting said grooves with said chamber, means for pressurizing said chamber to provide a force yieldingly urging said ring to said other member and further pressurizing the grooves for urging said ring away from said sealing surface to form an air bearing seal between said opposed sealing surfaces, said inner circumferential sealing means having approximately the same diameter as the diameter of said inner land on which the effective air bearing force is exerted, whereby the air bearing force is unaffected by changes in pressure radially inwardly of said ring.

2. An assembly comprising a frame and a rotor, said frame having a shaft portion, a seal assembly mounted on said frame concentrically of said shaft portion, said seal assembly comprising, first and second ring members having opposed radial sealing surfaces, said first ring member being rotatably mounted on said frame, said second ring member being mounted on said frame and axially movable into sealing relation with said first ring member, circumferential sealing means between said frame and said second ring member, means for yieldingly urging said second ring member into such sealing engagement, said rotor having a tubular portion telescopingly received between said seal assembly and said shaft portion, said rotor being journaled on said shaft portion, and means for interengaging and sealing said first ring member to said tubular portion whereby said first ring member is driven by said rotor, whereby an effective seal is provided with relative rotational movement only between the sealing surfaces of the ring members.

3. An assembly as in claim 2 wherein, said frame is shaped to form in combination with said second ring member an annular chamber sealed by said circumferential sealing means, means are provided for pressurizing said chamber, and further wherein said second ring member has axial extending holes therethrough opening into said opposing sealing surfaces, thereby providing an air bearing for positioning the first and second ring members in closely spaced relation.

References Cited
UNITED STATES PATENTS

| | | | |
|---|---|---|---|
| 2,895,751 | 7/1959 | Standish | 277—74 X |
| 3,033,577 | 5/1962 | Spiess | 277—3 |
| 3,093,382 | 6/1963 | Macks | 277—96 X |

SAMUEL ROTHBERG, *Primary Examiner.*